Oct. 28, 1930.     D. M. DUNWOODIE     1,779,806
HOSE CLAMP
Filed April 10, 1928
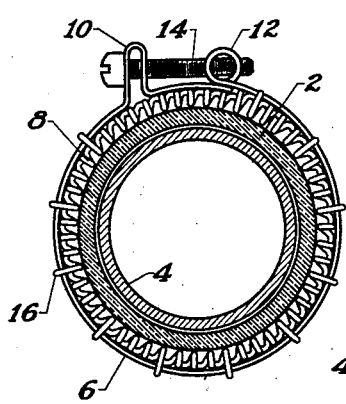
Fig. 2
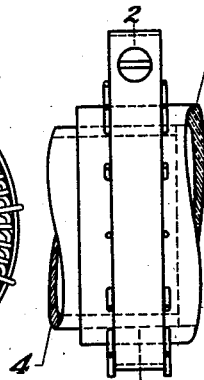
Fig. 1
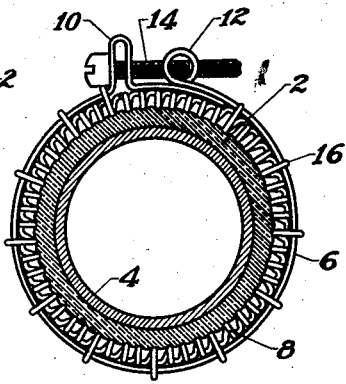
Fig. 3
Fig. 6
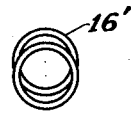
Fig. 7
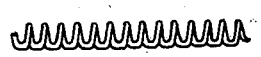
Fig. 12
Fig. 13
Fig. 8
Fig. 9
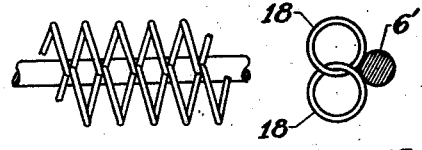
Fig. 14
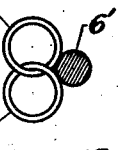
Fig. 15
Fig. 10
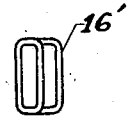
Fig. 11
Fig. 16
Fig. 17
Fig. 23
Fig. 24
Fig. 18
Fig. 19
Fig. 4
Fig. 5
Fig. 20
Fig. 21
Fig. 22
INVENTOR
BY David M. Dunwoodie
Robert H. Young
ATTORNEY Patented Oct. 28, 1930

1,779,806

UNITED STATES PATENT OFFICE

DAVID M. DUNWOODIE, OF DAYTON, OHIO

HOSE CLAMP

Application filed April 10, 1928. Serial No. 268,887.

This invention relates to a novel hose coupling.

It is the principal object of the present invention to provide a hose coupling which may be readily applied to a hose and which will clamp the hose in a manner to prevent leakage even though excessive high fluid pressures are established therethrough. To this end the well-known open ring clamp of any type used in securing a rubber hose or the like to a metal tube is provided with a resilient, contractible and expansible clamping member that is interposed between the rubber hose and open ring clamp.

This invention also contemplates provision of lugs or projections on either the inner or outer member of the clamp so that the one will be guided by the other.

This invention further contemplates the use of one or more internal loop bands with a single or plurality of external split ring clamps.

Further objects of my invention are to provide for greater simplicity, efficiency and economy in the construction and operation of that class of hose clamps which are used to connect rubber hose and metal pipes through which liquids pass; to eliminate the necessity of using rubber hose of a smaller diameter than the diameter of the tube on which it is forced for the purpose of obtaining a leak-proof joint and to insure against the puckering or the bite that is generally formed in using prior clamping devices of this nature.

These objects are attained by the various embodiments of my invention shown for purposes of illustration in the accompanying drawings, of which Fig. 1 is a side view of a device constructed in accordance with the invention as shown applied to a hose and tube.

Fig. 2 is a sectional view taken on the line 2—2 of Fig. 1.

Fig. 3 is a sectional view similar to Fig. 2 showing the crimping effect of the coupling when tightened.

Figs. 4 and 5 are plan and end view respectively of the internal band shown in Figs. 1 to 3.

Figs. 6 and 7 are side and end views of a section respectively of a modification of a coil adapted for the inner contractible and expansible member as shown in Figs. 1 to 3.

Figs. 8 and 9 are top plan and end views of a further modification of a coil showing one end portion of each loop of the expansible and contractible member bent upward with the bent portions in staggered relation.

Figs. 10 and 11 are top plan and end views respectively of a further modification.

Figs. 12 and 13 are side and end views respectively of a further modification of the inner member.

Figs. 14 and 15 are bottom plan and end views respectively of a further modification of applicant's invention.

Figs. 16 and 17 are bottom plan and side views respectively of a further modification of the looped member shown in Fig. 6.

Fig. 18 is a top plan view of a further modification.

Fig. 19 is an end view of Fig. 18.

Fig. 20 is a side view of Fig. 18.

Figs. 21 and 22 are top plan and end views respectively of a further modification, and Figs. 23 and 24 are top plan and end views respectively of a further modification.

Similar reference characters indicate corresponding parts throughout the several views of the drawings.

It is well-known that the open ring type of clamp because of its economy in construction, its simplicity and ease of assembly is extensively used, especially at such places where it is found expedient to use but a single hand in fastening the clamp to a hose connection; for example, in the airplane as well as in the automobile, very little working space is allowed for joining, through a hose clamp, the water jacket of the motor to the inlet and outlet pipes of the radiator.

It is well-known that the open ring type of clamp possesses the disadvantage of causing the flexible tube to pucker. This is due to the fact that with this type of clamp, it has been impossible to obtain a uniform pressure throughout the periphery of the hose. Puckering of the hose occurs generally at the point where the two ends of the split ring are joined together, due to the fact that the pressure of the clamp on the hose at this point is more or less relieved so that fluids gradually work their way through resulting in the loss of fluid and creating fire hazards in an airplane when this type of clamp is embodied in the fuel line.

The clamping ring as heretofore employed was inoperative for this purpose, due to the fact that in tightening the same about the rubber hose, a bite or pucker in the rubber hose would be formed at the junction of the ends of the ring. It is furthermore well known, that in forming the pucker due to tightening of the band, the rubber leaves the tube and an opening is created through which the liquid or gases may pass and regardless of the extent of tightening, the pucker still remains.

These disadvantages, however, have been overcome by my invention which consists in providing a split ring clamp hereinafter described as the "primary member" with a looped member hereinafter described as the "secondary member" formed in the shape of a ring and having its loops disposed substantially parallel to the axis of said primary member when placed between the split ring clamp and hose to be secured to the metallic tube. In adjusting the split ring clamp for tightening the rubber hose to the metallic tube a slipping action or relative movement takes place between the looped member and end portions of the ring clamp, which is separated from contact with the hose by the looped member, thereby preventing any frictioned contact with, or pulling action upon the hose.

At the same time the hose is crimped and uniformly pressed against the metal tube, the crimped material of the hose passing upwardly between the loops of the looped member.

It will be readily apparent that with my coupling because of the fact that means such as will be hereinafter described, has been provided to prevent the bite or pucker as well as to crimp and uniformly tighten the hose about the tube, a leak-proof and hermetic joint is made possible.

Referring to the drawings by numerals, 2 designates a portion of a rubber hose and 4 a metallic tube that may form a part of the inlet or outlet of any liquid container, the end of which is fastened in the hose by means of a device presently described.

It is not necessary to make the bore of the holes of a size smaller than the size of the tube in order to obtain a leak-proof joint as has been the usual practice, for as will be hereinafter described, a tight and leak-proof joint is obtained by the use of my device even though the bore of the hole may be considerably greater than the size of the tube.

This device comprises a split ring 6 and an internal contractible and expansible member formed in the shape of a ring 8. The split ring 6 as shown in the drawing is formed from a strip of flexible metal and provided at one end with a reversely bent portion 10 extending upwardly and outwardly of the band and the other end of said band is formed into a loop 12.

To facilitate the adjustment of the ring 6 a threaded member 14 is passed through openings in both the reversely bent portion 10 and the loop portion 12. It will be understood that it is not intended to limit my invention to the various modifications shown and described and that the term "split ring" is intended to cover any type of ring or band clamp in which the end portions of a flexible material are bent into circular form and are relatively moved to adjustably vary the diameter of the ring.

The loop member 8 as shown in Figs. 1 to 3 in the drawings is interposed between the hose 2 and the split ring 6. This member 8 is formed from a continuous strip of wire or equivalent material which is given a number of turns to form either a coil spring, such as shown in Figs. 4 to 17, or a flat ring-like member, provided with a plurality of reversely bent loops such as shown in Figs. 18 to 22.

Projecting upwardly from each side of the member 8 are lugs 16, which when the inner and outer members are in assembled relation extend upwardly past the side of the ring member 6 and guide, as well as retain same in place. It will be apparent that similar results may be obtained by providing the ring member instead of the loop member with these lugs. In Figs. 8, 9, 16, 17, 18, 19 and 20 these lugs or projections are integral and form a part of the loop, whereas in Figs. 1 to 5 small strips of wire are welded to the sides of the loop member for that purpose.

A further improvement of my invention is shown in Figs. 14 and 15 of the drawings in which two coiled members 18 have their loops inter-locked whereby a groove 20 is formed between the coiled members. In this groove a ring-like member 6' is positioned and is adjustable in any well-known manner.

A further improvement is shown in Figs. 6, 7, 10 and 11 in which the inner member is made from a strip of wire that is bent into a plurality of loops and then bent into circular form. At spaced intervals the loops 16 are raised slightly above the body of said member to provide an opening through which an outer member such as shown in Fig. 1 is laced. These loops guide and retain the outer member in position.

A further modification of my invention is shown in Figs. 21 to 24. In Figs. 23 and 24 the inner member is shown as made of a flexible strip of metal that is corrugated and bent into a ring or band, whereas in Figs. 21 and 22 the inner member is made from a strip of wire that is bent into a plurality of reversely bent loops lying in a horizontal plane. In this instance lugs or projections are not necessary due to the width of the outer member, so that when the outer member is tightened about the inner member the edge portions of the several loops are bent upward and serve as guides as well as retaining means for the outer member.

It is evident that when the split ring member is first tightened about the contractible and expansible member as shown in Fig. 3, the loops of the secondary member are caused to impinge upon and crimp the hose. Upon further tightening of the primary member the loops are caused to move closer together, thereby contracting the inner member and causing the hose to be uniformly crimped and tightened about the tube whereby a leakproof or hermetic joint is obtained.

When an inner member having convolutions or coils is used, the outer portion of such coils or convolutions which lie in the area at which the pucker is formed, are bent upwardly and at an angle to their normal position due to the necessarily greater displacement of the outer portion of the coils than the inner portion in contracting the internal band by the external band, so that, the force transmitted to the loops tend to push the hose away from the joint, whereby any tendency of a buckling of the rubber is prevented.

I claim:

1. A hose clamp of the class described comprising an outer flexible adjustable ring member, an inner contractible and expansible looped member having its loops disposed substantially parallel with the axis of said ring clamp and means for adjustably tightening said outer member about said inner member whereby said inner member is caused to contract.

2. A hose clamp of the class described comprising an outer flexible adjustable ring member, and inner contractible and expansible member having a plurality of spaced apart and circumferentially disposed portions and means for adjustably varying the diameter of said outer member.

3. A clamp of the class described for securing a flexible tube to a metallic tube, comprising a split ring member, means for adjustably contracting or expanding said ring member, contractible and expansible means having looped portions longitudinally disposed between said flexible tube and said ring member whereby said flexible tube is prevented from puckering when said ring member is contracted.

4. A hose clamp of the class described comprising an outer split ring member made of flexible metal strip, an inner contractible and expansible member having a plurality of loops and being freely and relatively movable with respect to said outer member and means for contracting and expanding said inner and outer members.

5. In combination with a split ring clamp for securing a flexible tube to a metallic tube of a contractible and expansible member disposed between said ring and said tube and provided with circumferentially spaced apart portions whereby in tightening said ring clamp, a puckering of the tube is prevented.

6. A hose clamp of the class described comprising a circumferentially adjustable ring-like member, contractible and expansible means disposed within and relatively freely movable with respect to said ring-like member and means for adjusting said ring-like member whereby said contractible and expansible means is caused to contract or expand.

7. A clamp of the class described for securing a flexible tube to a metallic tube, comprising a split ring member, contractible and expansible means having longitudinal looped portions disposed between said flexible tube and said ring member, and means for contracting said ring member relative to and independent of said contractible and expansible means whereby said flexible tube is prevented from puckering.

8. A clamp of the class described for securing a flexible tube to a rigid tube comprising a split ring member, a contractible and expansible member interposed between said flexible tube and split ring member, having a plurality of circumferentially disposed spaced apart portions and freely movable with respect to said split ring member and adjustable means for contracting said split ring member.

In testimony whereof I affix my signature.

DAVID M. DUNWOODIE.